May 4, 1926.
W. F. PFAU
BAND SAW WHEEL AND DEMOUNTABLE RIM THEREFOR
Filed Sept. 20, 1924
1,583,171
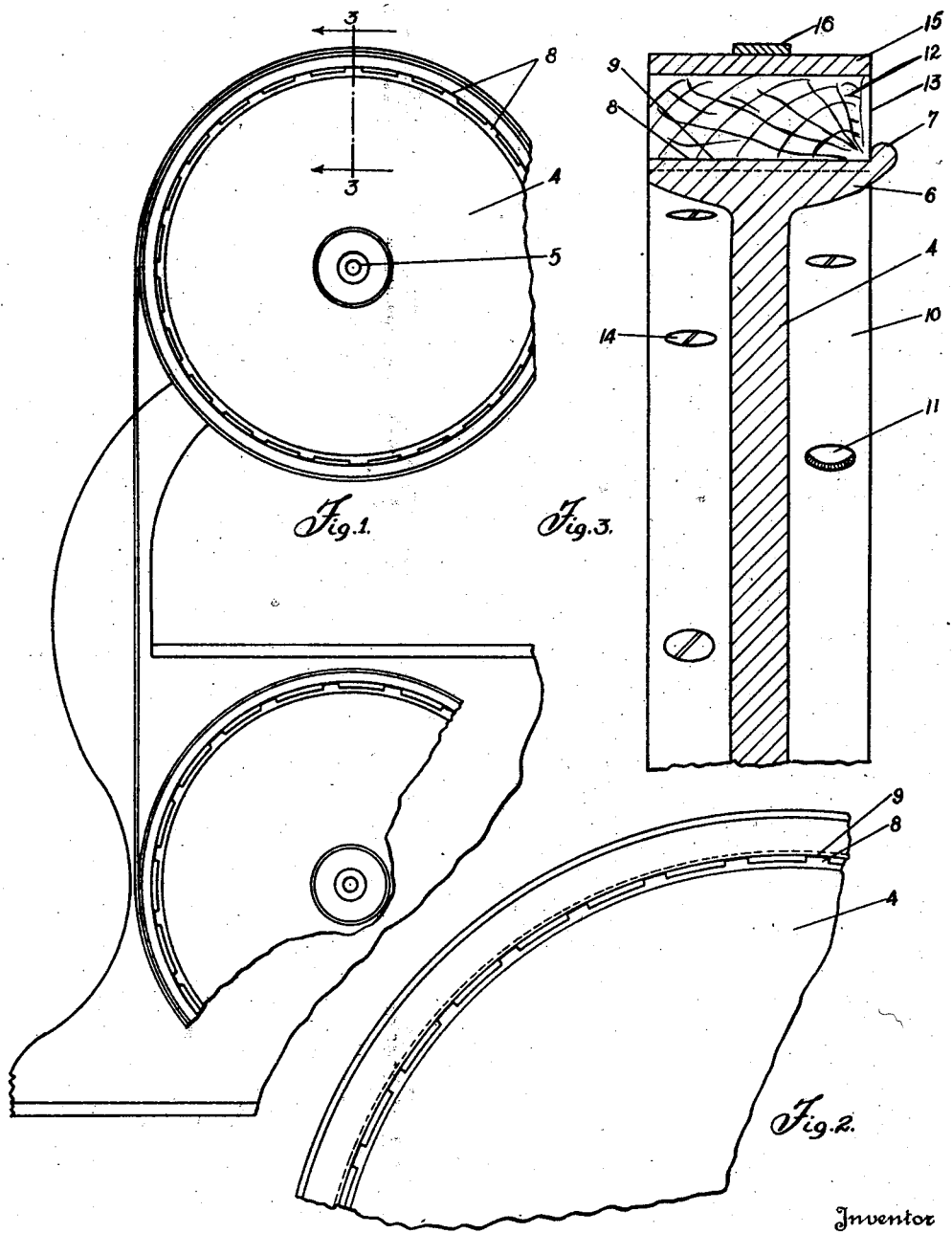
Inventor
WILLIAM F. PFAU,
Attorney Patented May 4, 1926.

1,583,171

UNITED STATES PATENT OFFICE.

WILLIAM F. PFAU, OF CINCINNATI, OHIO.

BAND-SAW WHEEL AND DEMOUNTABLE RIM THEREFOR.

Application filed September 20, 1924. Serial No. 738,965.

*To all whom it may concern:*

Be it known that I, WILLIAM F. PFAU, a citizen of the United States of America, and a resident of Cincinnati, in the county of Hamilton and State of Ohio, have invented new and useful Improvements in a Band-Saw Wheel and Demountable Rim Therefor, of which the following is a specification.

An object of my invention is to provide a novel structure in band saw wheels whereby a minimum of time and effort are required incident to retrueing said wheel rim.

Another object is to provide a band saw wheel having demountable and interchangeable rims.

Another object is to provide a demountable rim for band saw wheels which is light weight and is easily applied and removed.

These and other objects are attained by the means described herein and disclosed in the accompanying drawings, in which:

Fig. 1 is a fragmental side elevation of a band saw machine having mounted thereon a device of my invention.

Fig. 2 is an enlarged fragmental detail of the device embodying my invention.

Fig. 3 is a cross sectional view on line 3—3 of Fig. 1.

Heretofore it has been customary that when the tread or face of a band saw wheel became worn and out of true, it was necessary to remove the entire wheel and return the same to a factory or repair shop to be placed in condition for further use. The wheel of my invention comprises a disc 4 having a suitable bearing 5 therein and provided at its outer edge with a flange 6. Along one edge of the flange 6 is provided an outwardly and upwardly extending bead or lip 7. The face of the flange 6 is provided with a series of spaced lugs 8 extending transversely across said face. The disc wheel just described may be made of any suitable material such as aluminum. The outer faces 9 of the lugs 8 are turned so as to have such faces all concentric with the center of the wheel and to lie within the same circle. The inner sides 10 of the flange 6 are provided with a series of counter sunk perforations 11 which extend through the flange 6 and the lugs 8. The perforations 11 are provided on some of the lugs 8 and are positioned in staggered relation about the face 10 on opposite sides of the disc 4. A wooden felloe 12 is adapted to be slid over the wheel with its inner face engaging the faces 9 on the lugs 8 and with its one edge 13 engaging the bead 7. Wood screws 14 are then passed through the perforations 11 and into the felloe for securing the same to the wheel. The felloe is provided with a suitable tread 15 of fabric, rubber or the like upon which the band saw 16 may engage. The operation of the device is as follows:

When the tread 15 has become worn and out of true it is necessary only to remove the screws 14 and pull the felloe 12 from the wheel and to replace the worn rim with a spare. The rims of this type are inexpensive to manufacture and a number of extra rims may be kept on hand for replacing the worn ones which may be returned to the factory for the purpose of having new treads mounted thereon.

What I claim is:

1. In a band saw wheel the combination with a flanged disc, spaced lugs on the periphery of said wheel, the wheel having perforations extending through the flange and lugs, a circular felloe seated on the lugs, and removable means insertible through the perforations and extending into the felloe for removably securing the felloe to the wheel.

2. In a band saw wheel structure the combination of a disc wheel, an integral flange on said wheel and extending on opposite sides of the disc, integral spaced lugs extending transversely of the flange, said flange being provided with perforations disposed in staggered relation on opposite sides of the body of the wheel whereby each of said perforations is disposed adjacent opposite ends of adjacent lugs, a circular felloe adapted to be mounted on the lugs, and means insertible through the perforations for entry into the felloe.

3. In a device of the class described the combination with a disc wheel having a peripheral flange, spaced transverse lugs extending across the flange, a continuous bead integral with the flange at one side thereof and extending above the lugs, a circular wooden felloe adapted to be mounted upon the lugs in abutment with the bead, and removable means extending through the flange and lugs in spaced staggered relation.

In testimony whereof, I have hereunto subscribed my name this 18th day of September, 1924.

WILLIAM F. PFAU.